US012640964B1

(12) United States Patent
Huss et al.

(10) Patent No.: US 12,640,964 B1
(45) Date of Patent: May 26, 2026

(54) DIGITAL EQUALIZATION ADAPTATION WITH PARTIALLY UNSCRAMBLED DATA

(71) Applicant: Cadence Design Systems, Inc., San Jose, CA (US)

(72) Inventors: Scott David Huss, Cary, NC (US); Kelvin E. McCollough, Garner, NC (US); Douglas Scott Shelton, Kingsville, MD (US); Matthew Robert Collin, Cary, NC (US); Dayu Yang, Apex, NC (US)

(73) Assignee: Cadence Design Systems, Inc., San Jose, CA (US)

( * ) Notice: Subject to any disclaimer, the term of this patent is extended or adjusted under 35 U.S.C. 154(b) by 77 days.

(21) Appl. No.: 18/948,166

(22) Filed: Nov. 14, 2024

(51) Int. Cl.
*H04L 25/03* (2006.01)

(52) U.S. Cl.
CPC ................. *H04L 25/03006* (2013.01); *H04L 2025/03433* (2013.01); *H04L 2025/03745* (2013.01); *H04L 2025/03815* (2013.01)

(58) Field of Classification Search
CPC ..... H04L 25/03006; H04L 2025/03433; H04L 2025/03745; H04L 2025/03815
See application file for complete search history.

(56) References Cited

U.S. PATENT DOCUMENTS

| | | | | |
|---|---|---|---|---|
| 2003/0156656 A1* | 8/2003 | Ojard | ........................ | H04L 5/06 |
| | | | | 375/295 |
| 2010/0309970 A1* | 12/2010 | Meyer | ................. | H04L 27/0014 |
| | | | | 375/329 |
| 2015/0200649 A1* | 7/2015 | Trager | ............... | H03H 17/0628 |
| | | | | 341/61 |
| 2019/0199556 A1* | 6/2019 | Sato | ...................... | H04B 1/1081 |
| 2020/0374011 A1* | 11/2020 | Zhou | .................. | H04B 10/6162 |
| 2021/0297288 A1* | 9/2021 | Guerena | ........... | H04L 25/03974 |
| 2023/0208687 A1* | 6/2023 | Subramaniam | ... | H04L 25/03133 |
| | | | | 375/231 |

* cited by examiner

*Primary Examiner* — Janice N Tieu
(74) *Attorney, Agent, or Firm* — Schwegman Lundberg & Woessner, P.A.

(57) ABSTRACT

Methods and systems are provided for training an equalizer of a receiver. The methods and systems access a training sequence comprising a plurality of unscrambled portions interleaved with a plurality of scrambled portions and instruct an analog-to-digital converter (ADC) to sample the training sequence to generate a first set of digital symbols representing the plurality of unscrambled portions and the plurality of scrambled portions to an equalizer. The methods and systems cause the ADC to periodically slip sampling of the training sequence to generate a second set of digital symbols in which the plurality of unscrambled portions of the training sequence are randomized and train one or more coefficients of the equalizer using the first set of digital symbols and the second set of digital symbols.

20 Claims, 10 Drawing Sheets

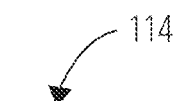
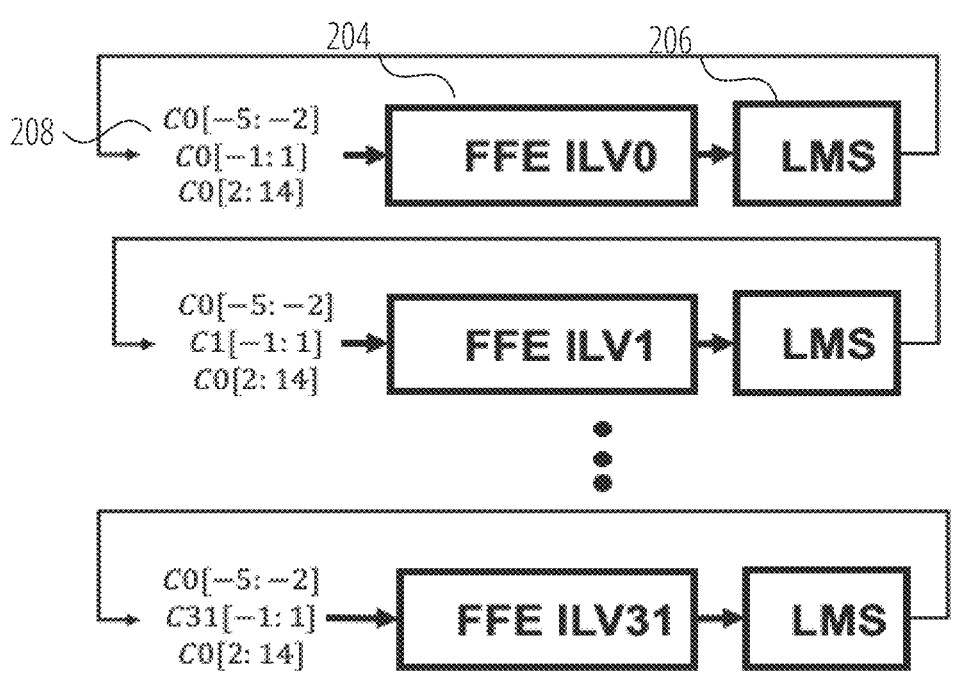
FIG. 2

402

| CTRL[0] | CTRL[1] | Operational Mode§ | |
|---|---|---|---|
| 0§ | 0§ | Nominal divide-by-8 clocking.§ | 404 |
| 0§ | 1§ | Nominal divide-by-8 clocking.§ | 406 |
| Rising Edge§ | 0§ | Single divide-by-9 clock period inserted. § | 408 |
| 1§ | 0§ | Nominal divide-by-8 clocking. § | 410 |
| 1§ | 1§ | Continuous divide-by-9 clocking. § | 412 |

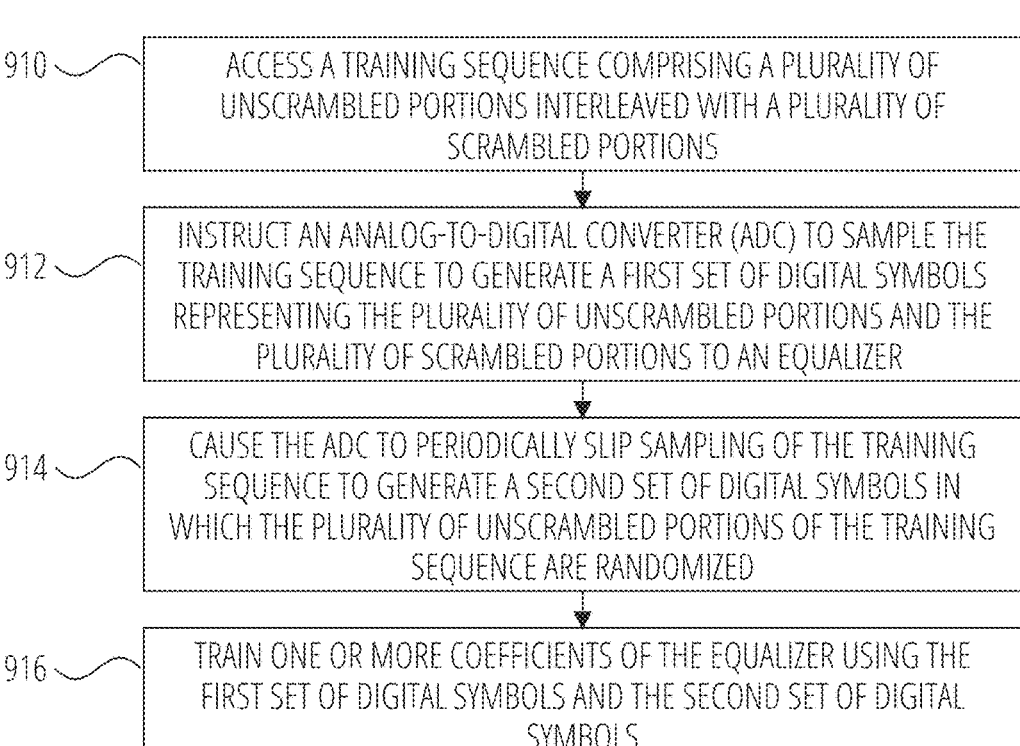

910 — ACCESS A TRAINING SEQUENCE COMPRISING A PLURALITY OF UNSCRAMBLED PORTIONS INTERLEAVED WITH A PLURALITY OF SCRAMBLED PORTIONS

912 — INSTRUCT AN ANALOG-TO-DIGITAL CONVERTER (ADC) TO SAMPLE THE TRAINING SEQUENCE TO GENERATE A FIRST SET OF DIGITAL SYMBOLS REPRESENTING THE PLURALITY OF UNSCRAMBLED PORTIONS AND THE PLURALITY OF SCRAMBLED PORTIONS TO AN EQUALIZER

914 — CAUSE THE ADC TO PERIODICALLY SLIP SAMPLING OF THE TRAINING SEQUENCE TO GENERATE A SECOND SET OF DIGITAL SYMBOLS IN WHICH THE PLURALITY OF UNSCRAMBLED PORTIONS OF THE TRAINING SEQUENCE ARE RANDOMIZED

916 — TRAIN ONE OR MORE COEFFICIENTS OF THE EQUALIZER USING THE FIRST SET OF DIGITAL SYMBOLS AND THE SECOND SET OF DIGITAL SYMBOLS

FIG. 9

DIGITAL EQUALIZATION ADAPTATION WITH PARTIALLY UNSCRAMBLED DATA

TECHNICAL FIELD

The present disclosure generally relates to the adaptive equalization in high-speed serial interfaces, particularly for Peripheral Component Interconnect Express (PCIe) receivers, to mitigate intersymbol interference (ISI).

BACKGROUND

High-speed serial interfaces, such as those used in PCIe systems, face challenges in maintaining signal integrity and reliable data transmission as data rates continue to increase. These interfaces contend with various channel impairments, including ISI, which can degrade signal quality and increase bit error rates. To address these issues, modern receivers employ sophisticated adaptive equalization techniques, such as Decision Feedback Equalizers (DFE) and Feed-Forward Equalizers (FFE), often in conjunction with adaptive algorithms like Least Mean Squares (LMS). These equalization methods work to compensate for channel-induced distortions and optimize signal recovery.

BRIEF DESCRIPTION OF THE DRAWINGS

To easily identify the discussion of any particular element or act, the most significant digit or digits in a reference number refer to the figure number in which that element is first introduced.

Various ones of the appended drawings merely illustrate examples of the present inventive subject matter and cannot be considered as limiting its scope.

FIG. 2 illustrates an equalizer of the PCIE receiver, in accordance with some examples.

FIG. 4 illustrates configurations of the PCIE receiver, in accordance with some examples.

FIG. 6 illustrates a timing diagram of signal used and generated by the clock circuitry of the PCIE receiver, in accordance with some examples.

FIG. 9 illustrates a routine performed by the PCIE receiver, in accordance with some examples.

DETAILED DESCRIPTION

Figure 1:
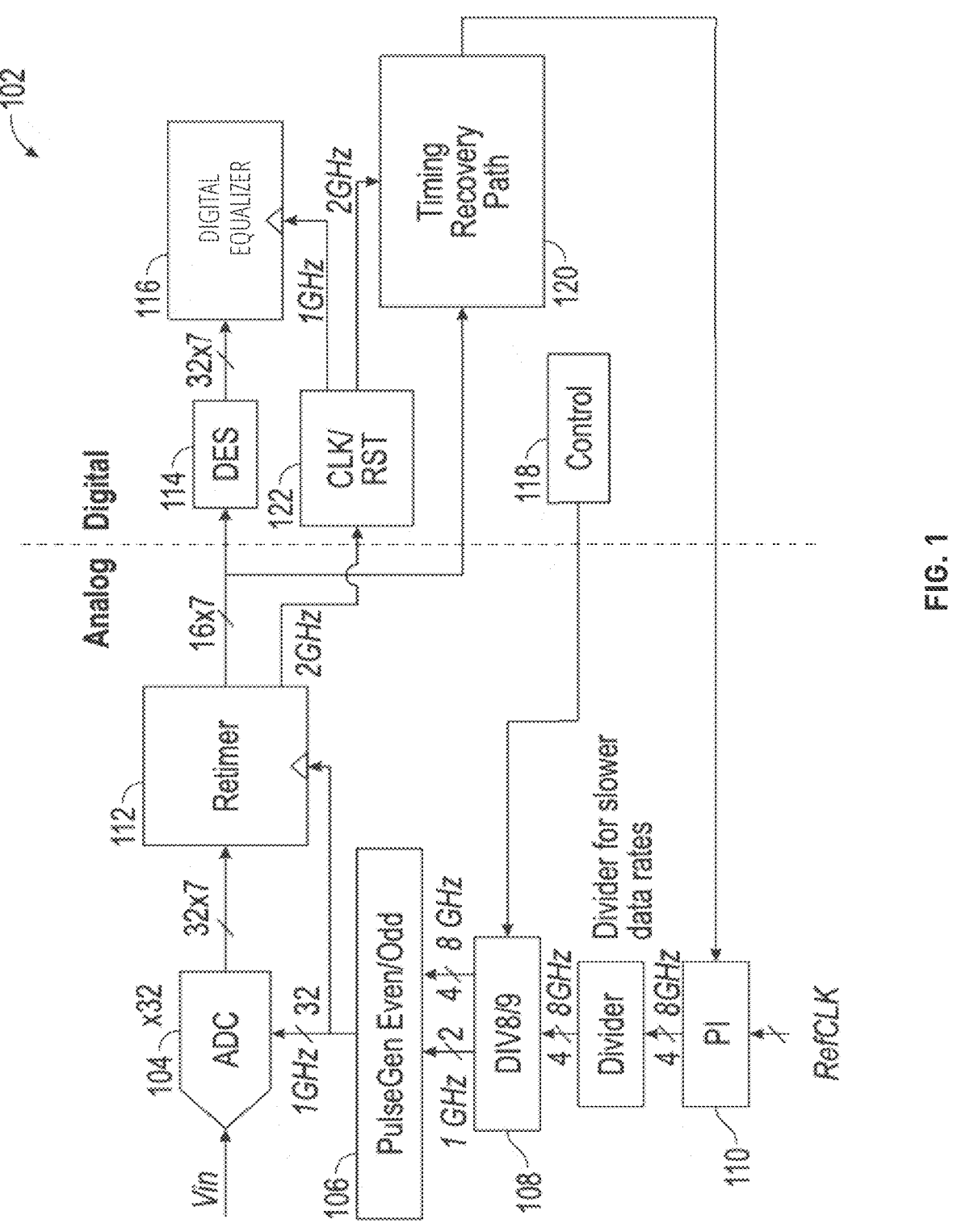
FIG. 1 illustrates a PCIE receiver, in accordance with some examples.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Equalizers in high-speed serial interfaces like new generation PCIe receivers are typically trained using specific training sequences. These sequences are designed to help the equalizer adapt to channel characteristics and optimize its performance. The training process involves sending known data patterns (referred to as training sequences) through the channel and adjusting the equalizer coefficients to minimize errors in the received signal.

In new generation PCIe receivers, the training sequence structure has changed from previous generations. The new encoding scheme introduced in these newer generations presents a unique challenge for equalizer training, particularly when dealing with partially unscrambled data patterns. The issue arises because the training sequence in new generation PCIe receivers contains both scrambled and unscrambled portions and, in a multi-interleave design with MIMO (Multiple Input Multiple Output) equalization, some interleaves consistently see constant values from the transmitter during the unscrambled portion of the pattern. This consistency in the unscrambled data can lead to incorrect adaptation of both the Feed-Forward Equalizer (FFE) and offset correction mechanisms.

The problem is particularly pronounced for FFE interleaves where the unscrambled data is near the cursor (main tap). This mis-adaptation can result in suboptimal equalization performance and potentially increased bit error rates. The lack of variation in the positioning of the unscrambled data patterns means that certain equalizer taps consistently receive the same input during training. This can lead to biased adaptation, where some taps are over-optimized for the specific unscrambled pattern while others may be underutilized. The result is an equalizer that performs well for the training sequence but may struggle with actual data transmission that includes a random mix of scrambled and unscrambled data.

The disclosed techniques address these issues by introducing a periodic slip in the sampling of the training sequences. This helps to randomize the unscrambled portion of the pattern as seen by the equalizer. By doing so, the disclosed techniques ensure that all taps of the equalizer are exposed to a more diverse set of data patterns during training, leading to a more robust and generalized adaptation. Specifically, the disclosed receiver implements an adaptive clock division mechanism that primarily uses one division ratio but intermittently (e.g., periodically and/or randomly) uses a different ratio for a single cycle. This technique introduces a periodic slip in the analog-to-digital converter (ADC) sampling, which helps to randomize the unscrambled portion of the pattern as seen by the equalizer. This ensures that all taps of the equalizer are exposed to a more diverse set of data patterns during training.

The PCIE (or PCIe) receiver described in the examples implements an innovative approach to address challenges with equalizer training in the presence of partially unscrambled data patterns. For instance, the receiver employs an ADC that samples a training sequence containing both scrambled and unscrambled portions. To mitigate issues caused by consistent unscrambled patterns, the ADC periodically "slips" its sampling, effectively randomizing the unscrambled portions.

In some cases, the receiver utilizes sophisticated clock circuitry capable of providing two or more sets of clock signals to the ADC. The first set is used for normal sampling, while the second set, with a lower frequency, is used to create the sampling slip. This mechanism can be referred to as a divide-by-8/9 clock technique. Furthermore, the clock circuitry is controlled to provide the lower frequency clock signals for a single sampling cycle, creating a periodic slip. For example, this is achieved by detecting specific conditions and manipulating the clock signals, such as holding certain clock values or swallowing clock pulses.

The receiver also includes configuration options to control how often the sampling slip occurs, allowing for periodic, random, and/or one-time slips. This flexibility enables fine-tuning of the randomization process. In some instances, the receiver can access a configuration register to determine the frequency of these slips, which can be adjusted based on specific requirements.

Each time the ADC slips sampling, the unscrambled portions are rotated across different taps of the equalizer. This rotation helps ensure that all taps are exposed to a variety of data patterns, preventing biased adaptation. For example, if the unscrambled portions include four unit intervals (UIs), they are rotated by four UIs across the equalizer taps with each slip. While the examples provide specific values (such as dividing by 8 and 9, or 4 UI unscrambled portions), these align with the more general solution discussed earlier. In some cases, these specific values can be adjusted based on the particular PCIE generation or implementation requirements.

This approach effectively implements the adaptive clock division mechanism, providing a practical solution to the challenges of equalizer training with partially unscrambled data patterns in new generation PCIE receivers. By combining these techniques, the receiver ensures more reliable and accurate data transmission in high-speed PCIE interfaces by optimizing equalizer performance across a wider range of data patterns.

Reference will now be made in detail to specific examples for carrying out the disclosed subject matter. Examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

FIG. 1 illustrates a PCIE receiver 102, in accordance with some examples. Specifically, FIG. 1 illustrates a high-level block diagram of a PCIE receiver 102, showcasing the integration of various components used for digital equalization adaptation with partially unscrambled data. The diagram is divided into two main sections: the analog and digital domains.

In the analog domain, the input signal is fed into the ADC 104. The ADC 104 is responsible for converting the analog input signal into a digital format, producing a 32×7 output that is subsequently processed by the retimer 112. The retimer 112 ensures that the digital signals are synchronized and aligned correctly for further processing.

The pulse generator 106 component generates non-overlapping sampling pulses for the ADC, operating at a frequency of 1 GHz. This component helps maintain the timing accuracy required for high-speed data processing. The clock divider 108 is a component that provides clock division functionality, allowing the system to switch between one clock division ratio (e.g., divide-by-8 mode) and another clock division ratio (e.g., divide-by-9 mode). This flexibility is important for adapting to different data rates and ensuring optimal performance of the receiver in processing a training sequence. The Phase Interpolator (PI) (phase interpolator 110) is used to fine-tune the phase of the clock signals, providing precise control over the timing of the data sampling process. This component helps achieve accurate data recovery in high-speed communication systems.

In the digital domain, the output from the retimer 112 is fed into the deserializer 114, which can operate on 16×7 data signals. The digital equalizer 116 is responsible for mitigating ISI by using past decision data to adjust the current data processing, thereby enhancing signal integrity. The digital equalizer 116 processes the 32×7 bit output from the deserializer 114 using one or more equalizer components, preparing the data for further transmission or processing. This path is optimized for high-speed data handling, ensuring minimal latency and maximum throughput.

The recovered clock signal 122 provides clock and reset signals to various components within the receiver, operating at frequencies of 1 GHz and 2 GHz. This block helps maintain synchronization across the system. The timing recovery 120 (also includes a feed forward equalizer, such as feed forward equalizer 204) is responsible for recovering timing information from the incoming data stream, ensuring that the data is sampled at the correct intervals. This path works in conjunction with the controller 118 (e.g., one or more processors or control circuits), which manages the overall operation of the receiver, adjusting parameters as needed to optimize performance.

Together, these components of the PCIE receiver 102 form a sophisticated system capable of handling high-speed data transmission with improved equalization and timing recovery, addressing the challenges posed by partially unscrambled data patterns in modern PCIe interfaces.

Figure 3:
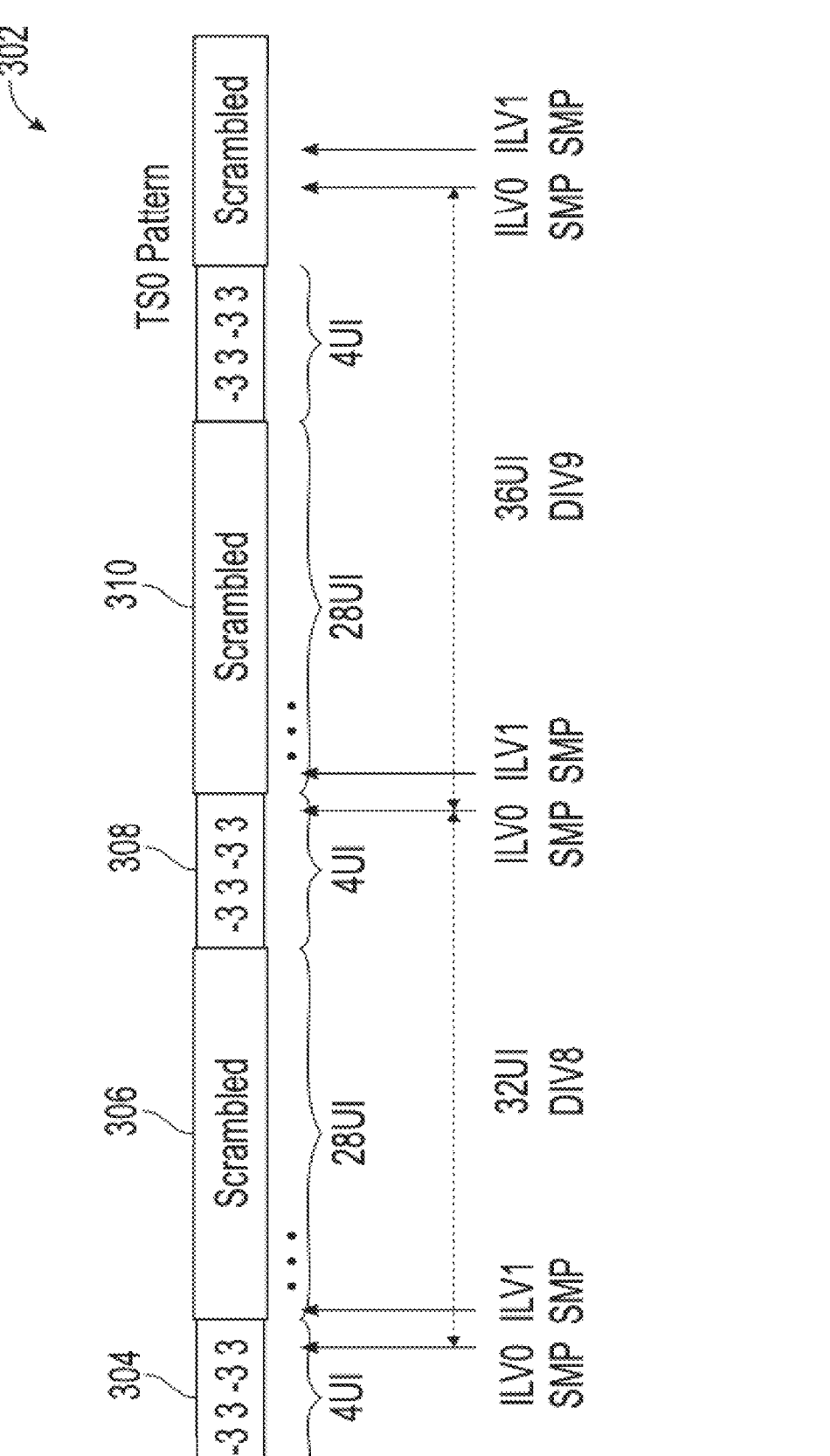
FIG. 3 illustrates a training sequence used by the PCIE receiver, in accordance with some examples.

Specifically, the controller 118 can perform operations to access a training sequence that includes a plurality of unscrambled portions interleaved with a plurality of scrambled portions. For example, as shown in FIG. 3, the controller 118 can access the training sequence 302. The training sequence 302 includes a first unscrambled data portion 304, a first scrambled data portion 306, a second unscrambled data portion 308, and a second scrambled data portion 310. The first unscrambled data portion 304 can include four unit intervals of data having a known or predetermined pattern (e.g., –3V, 3V, –3V, 3V) which can be decoded into a digital representation by the ADC 104 using a clock signal. Following the first unscrambled data portion 304, the first scrambled data portion 306 includes 28 unit intervals of scrambled data having an unknown or random pattern. Then, following the first scrambled data portion 306, another second unscrambled data portion 308 is provided having a known pattern corresponding to the same pattern as first unscrambled data portion 304. This second unscrambled data portion 308 is followed by another second scrambled data portion 310 of random scrambled data.

By processing the training sequence 302, the digital equalizer 116 of the PCIE receiver 102 can be trained. Specifically, as shown in FIG. 2, the digital equalizer 116 can continuously or periodically update coefficients 208 of the feed forward equalizer 204 and least means square 206. By processing the training sequence 302, the digital equalizer 116 of the PCIE receiver 102 can be trained to optimize its performance in mitigating ISI and other channel-induced distortions. This training process ensures reliable data transmission in high-speed PCIE interfaces of the PCIE receiver 102.

Specifically, as shown in FIG. 2, the digital equalizer 116 can continuously or periodically update coefficients 208 of the feed forward equalizer (FFE) 204 and least mean square (LMS) 206 components. The FFE 204 is responsible for compensating for pre-cursor and post-cursor ISI, while the LMS 206 algorithm adapts the FFE coefficients to minimize the error between the equalized signal and the desired signal. The training process involves sending the known training sequence 302 through the channel and into the PCIE receiver 102. As the ADC 104 samples this sequence, it generates digital symbols representing both the scrambled and unscrambled portions of the training sequence. These digital symbols are then processed by the digital equalizer 116.

The FFE 204 applies its current coefficients to the incoming digital symbols, attempting to compensate for channel distortions. The output of the FFE is compared to the expected ideal signal, and the difference is used by the LMS 206 algorithm to calculate updates for the FFE coefficients. This process is repeated iteratively, with the goal of minimizing the error and optimizing the equalizer's performance.

In some cases, the presence of unscrambled portions in the training sequence can lead to biased adaptation if not properly addressed. This is where the adaptive clock division mechanism implemented by the clock divider 108 comes into play. By periodically slipping the sampling of the training sequence performed by the ADC 104, the PCIE receiver 102 ensures that the unscrambled portions are effectively randomized across different taps of the digital equalizer 116.

Figure 8:
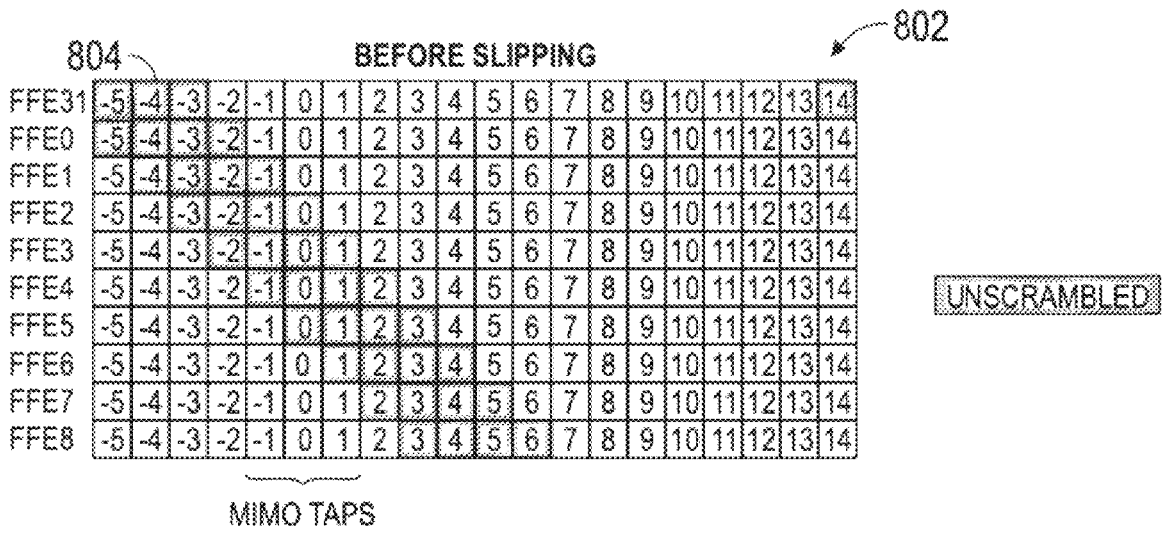
FIG. 8 illustrates an example output of the PCIE receiver, in accordance with some examples.

Each time a sampling slip occurs, the unscrambled portions of the training sequence are rotated across the equalizer taps. This rotation exposes all taps to a variety of data patterns (as shown in FIG. 8, preventing any single tap from being over-optimized for a specific unscrambled pattern. As a result, the FFE coefficients of the digital equalizer 116 are updated based on a more diverse set of input patterns, leading to a more robust and generalized adaptation.

Specifically, FIG. 8 illustrates the rotation of the training sequence 302 across the taps of the digital equalizer 116 as a result of the adaptive clock division mechanism implemented in the PCIE receiver 102. FIG. 8 shows a diagram 802 of three states of the Feed-Forward Equalizer (FFE) taps: before slipping (showing a first position of unscrambled portion 804), after the first slip (showing a second position of unscrambled portion 806), and after the second slip (showing a third position of unscrambled portion 808). Each state represents how the unscrambled and scrambled portions of the training sequence are positioned across the FFE taps.

In the "Before Slipping" state, it is shown that the unscrambled portions of the training sequence (represented by the darker shaded areas) are consistently positioned across certain taps for each FFE interleave (FFE0 to FFE31). This consistent positioning can lead to biased adaptation of the equalizer coefficients.

After the first slip, the unscrambled portions have been rotated by a specific number of unit intervals (UIs, such as 4 UIs) across the FFE taps. This rotation is achieved by the periodic sampling slip introduced by the clock divider 108 switching to a different division ratio for a single cycle. As a result, the unscrambled portions now appear in different positions relative to the cursor (main tap) for each FFE interleave. The "After 2nd Slip" state shows the effect of a second sampling slip. The unscrambled portions have been rotated once again, further randomizing their positions across the FFE taps. This continuous rotation ensures that all taps of the equalizer are exposed to both scrambled and unscrambled portions of the training sequence over time.

By implementing this rotation mechanism, the PCIE receiver 102 addresses the challenge of biased adaptation caused by consistent unscrambled patterns. Each FFE tap now experiences a variety of data patterns, both scrambled and unscrambled, allowing for more robust and generalized adaptation of the equalizer coefficients. This approach ultimately leads to improved equalization performance across a wider range of data patterns in high-speed PCIE interfaces.

Namely, the continuous or periodic updating of the coefficients allows the digital equalizer 116 to adapt to changes in channel conditions over time. This adaptive process ensures that the equalizer maintains optimal performance even as environmental factors or signal characteristics may change during operation. By implementing this sophisticated training process, which combines LMS adaptation with the innovative adaptive clock division mechanism, the PCIE receiver 102 can effectively address the challenges posed by partially unscrambled data patterns of the training sequence 302 in modern PCIE interfaces, ensuring more reliable and accurate data transmission at high speeds.

FIG. 4 illustrates configurations of the PCIE receiver 102, in accordance with some examples. Specifically, FIG. 4 shows a configuration table 402 that can be used by the controller 118 to selectively and adaptively control when different clock frequencies are generated by the clock divider 108 to randomize the training sequence 302 that is processed by the ADC 104. The controller 118 can access the configuration table 402 to read the bit fields that are currently stored as the configuration data for the PCIE receiver 102. Based on the read bit fields, the controller 118 can select between different modes of operations.

For example, the controller 118 can determine that a first combination of bit fields of the configuration table 402 correspond to the first configuration 404. In such cases, the controller 118 can configure the clock divider 108 to perform a conventional division of the clock signal, such as by dividing the clock signal by a first value (e.g., a value of 8). Similar configurations can be implemented for the second configuration 406 and the fifth configuration 412 but for different division values of the clock signal. The fourth configuration 410 can correspond to a normal divide-by-8 clocking scheme similar to second configuration 406.

As an example, the controller 118 can determine that a second combination of bit fields of the configuration table 402 correspond to the third configuration 408. In such cases, the controller 118 can set a condition for controlling the clock divider 108 to generate one or more clock signals that are slower than nominal clock signals used to process a training sequence 302, such as by dividing the reference clock by a second value (e.g., a value of 9). In the third configuration 408, the controller 118 can control the clock divider 108 to only divide the reference clock by the second value for a single cycle of the ADC 104. The process for dividing the reference clock for the single cycle by the second value is discussed in connection with FIG. 5 below.

As an example, the controller 118 can determine that a third combination of bit fields of the configuration table 402 correspond to the fifth configuration 412. In such cases, the controller 118 can set a condition for controlling the clock divider 108 to generate one or more clock signals that are slower than nominal clock signals used to process a training sequence 302, such as by dividing the reference clock by a second value (e.g., a value of 9). In the fifth configuration 412, the controller 118 can control the clock divider 108 to divide the reference clock by the second value periodically and/or randomly multiple times for multiple ADC 104 cycles. The process for dividing the reference clock periodically by the second value is discussed in connection with FIG. 5 below. The periodicity for temporarily and periodically dividing the clock by the second value can be stored in the configuration table 402 also. In some cases, the periodicity can change randomly using a linear feedback shift register or other component using one or more randomization values stored in the configuration table 402.

FIG. 4 presents a truth table that outlines the operational modes of the adaptive clock division mechanism, which is implemented through two analog control bits, CTRL[1:0]. The truth table in FIG. 4 defines four distinct operational modes:

When both control bits are 0, the receiver operates with nominal divide-by-8 clocking.

When CTRL[0] is 0 and CTRL[1] is 1, the receiver again operates with nominal divide-by-8 clocking, but is prepared for a change on the rising edge of the control signal.

When CTRL[0] is 1 and CTRL[1] is 0, a single divide-by-9 clock period is inserted, after which the system returns to nominal divide-by-8 clocking. The CTRL[0] may correspond to the Div9 signal of FIG. 5 and CTRL[1] may correspond to the Div9_cont signal of FIG. 5.

When both control bits are 1, the system operates in continuous divide-by-9 clocking mode.

This adaptive clock division mechanism enables randomizing the unscrambled portions of the training sequence across different taps of the digital equalizer 116. By periodically inserting a divide-by-9 clock period, the system introduces a controlled slip in the sampling process. This slip causes the unscrambled portions of the training sequence to be rotated across the equalizer taps, preventing biased adaptation and ensuring that all taps are exposed to a variety of data patterns.

The flexibility provided by these different modes allows the system to fine-tune its operation based on specific requirements or conditions. For example, the single divide-by-9 insertion mode can be used to create periodic, controlled sampling slips, while the continuous divide-by-9 mode might be used in certain diagnostic or calibration scenarios.

By implementing this adaptive clock division mechanism, the PCIE receiver can effectively address the challenges posed by partially unscrambled data patterns in training sequences. This leads to more robust and generalized adaptation of the equalizer coefficients, ultimately improving the performance of high-speed PCIE interfaces.

Figure 5:
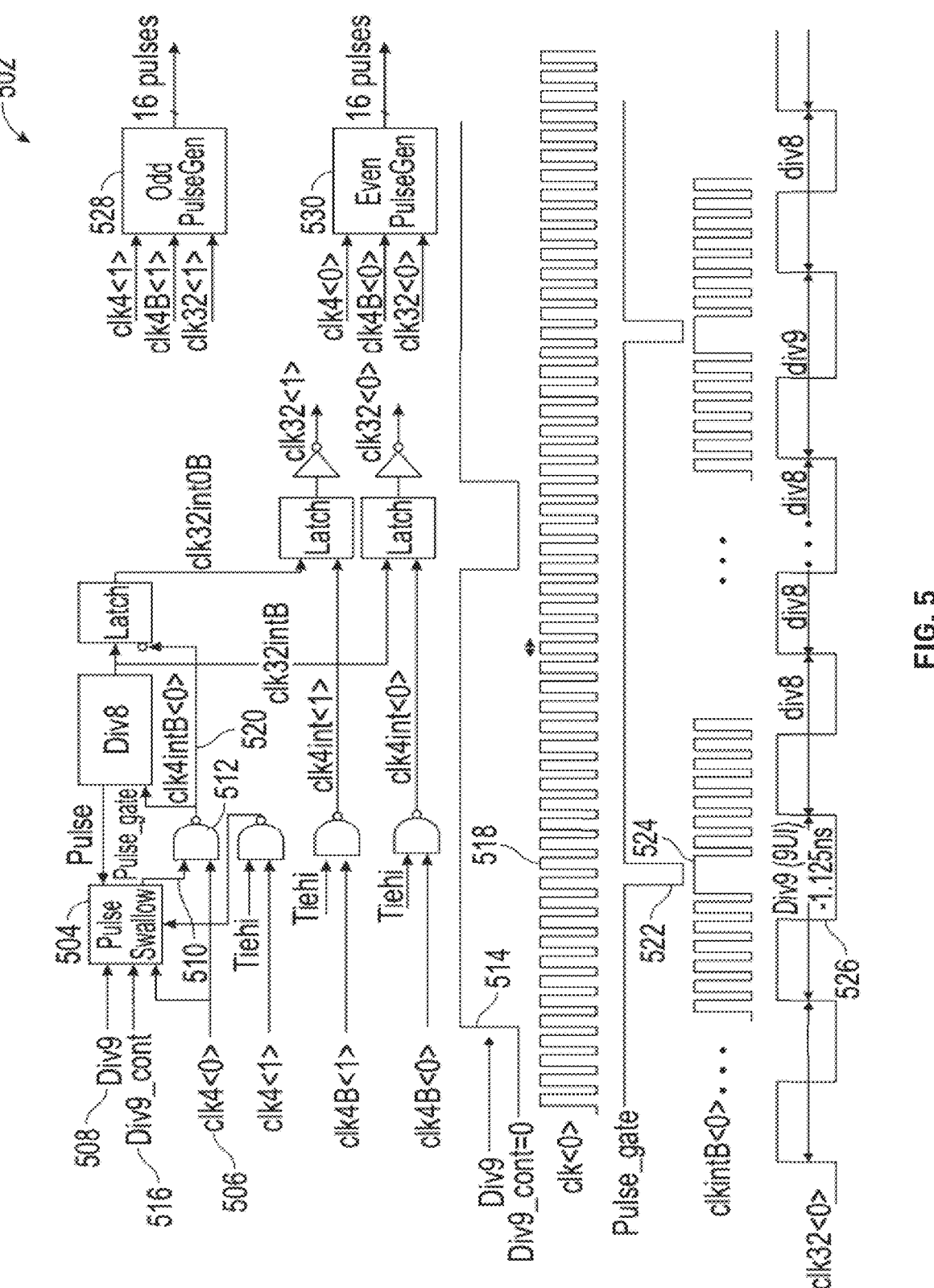
FIG. 5 illustrates clock circuitry used by the PCIE receiver, in accordance with some examples.

FIG. 5 illustrates clock circuitry 502 used by the PCIE receiver 102, in accordance with some examples. Specifically, FIG. 5 illustrates the detailed operation of the Div8or9 component (e.g., clock divider 108), which is an element of the adaptive clock division mechanism in the PCIE receiver 102. This clock divider 108 is responsible for generating the clock signals that control the sampling process of the ADC 104, allowing for the periodic insertion of a divide-by-9 cycle to create the sampling slip.

The clock divider 108 takes several inputs, including Div9 (a control signal that triggers the insertion of a divide-by-9 cycle), Div9_cont (a control signal that determines whether the divide-by-9 mode should be continuous or one-shot), and clk4<0> and clk4<1> (input clock signals). It generates two primary outputs: clk32<0> and clk32<1>, which are used to drive the ADC sampling.

During normal operation (divide-by-8 mode), when Div9 is low, the input clk4 signals are divided by 8 to generate the clk32 output signals. When Div9 is asserted, the clock divider 108 inserts a divide-by-9 cycle through the "Pulse Swallow" logic (e.g., implemented by the pulse swallow component 504), which effectively "swallows" one pulse of the input clock (e.g., the first clock signal 506), extending the period of the output clock (e.g., second clock signal 520). This can be performed by driving the pulse gate signal 510 low to the input of the NAND gate 512 that takes in as another input the first clock signal 506. When the pulse gate signal 510 is high, the output including the second clock signal 520 corresponds to the first clock signal 506.

The Div9_cont signal (e.g., generating the Div9 condition 516) determines whether the divide-by-9 (e.g., the Div9 signal 508) insertion is a one-time event or continuous. When Div9_cont is low, a single divide-by-9 cycle is inserted upon Div9 assertion. When Div9_cont is high, the clock divider 108 continues to operate in divide-by-9 mode as long as Div9 is asserted.

The clock divider 108 also generates non-overlapping pulses for both even and odd samples using the odd pulse generator 528 and the even pulse generator 530, which are used to control the sampling of the ADC 104. The timing diagram in the lower part of FIG. 5 illustrates how the clk32 signals are generated from the input clk4 signals and how the divide-by-9 insertion affects the timing, clearly showing the extension of the clock period during the divide-by-9 cycle. Specifically, as shown in the timing diagram, the first clock signal 518 has a first frequency or period while the Div9 signal 514 remains high and the pulse gate signal 510 is not triggered. In response to the pulse gate signal 510 being triggered and going to a low value, the pulse swallow component 504 swallows a pulse to generate the second clock signal 524 which has a longer period or lower frequency than the first clock signal 518. In some cases, the second clock signal 524 (e.g., clk32) has a period of 1.125 ns for one cycle of the ADC 104 when the pulse gate transition 522 is detected and then the clock signal (clk32) returns to having a period of Ins. The pulse gate transition 522 can be transitioned periodically, one time, and/or randomly depending on the configuration stored by the configuration table 402 or registers of the PCIE receiver 102.

This mechanism is important to the approach of randomizing unscrambled portions of the training sequence. By periodically inserting a divide-by-9 cycle, it creates a controlled slip in the ADC sampling process, causing the unscrambled portions of the training sequence to be rotated across different taps of the equalizer. This prevents biased adaptation and ensures that all taps are exposed to a variety of data patterns, ultimately improving the performance of high-speed PCIE interfaces.

Figure 6:
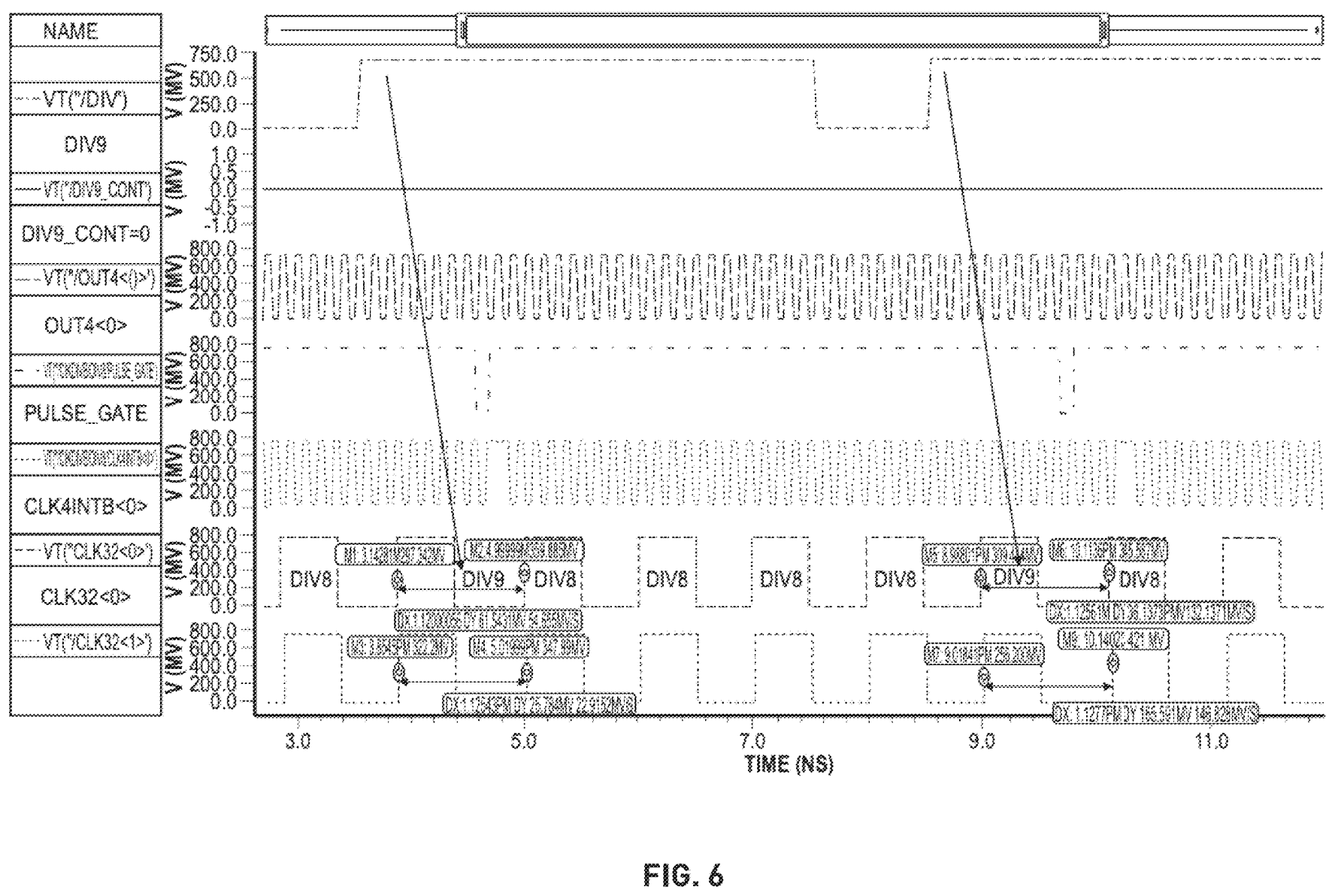

FIG. 6 illustrates a timing diagram of signal used and generated by the clock circuitry of the PCIE receiver, in accordance with some examples. Additional details of the transitions and the clock periods can be seen in FIG. 6.

Figure 7:
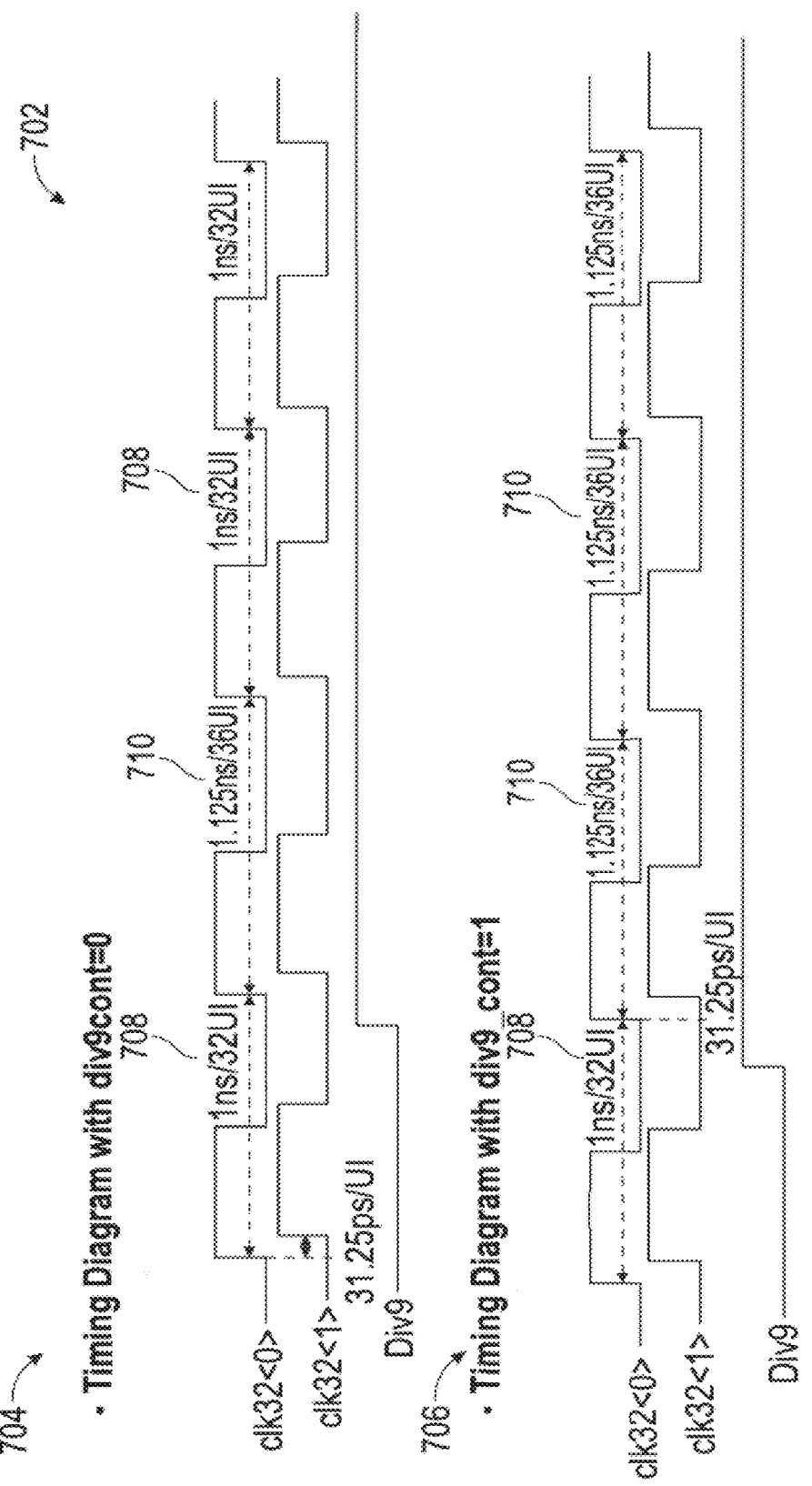
FIG. 7 illustrates timing diagrams of signal used and generated by the clock circuitry of the PCIE receiver, in accordance with some examples.

FIG. 7 illustrates timing diagrams 702 of signal used and generated by the clock circuitry of the PCIE receiver, in accordance with some examples. Specifically, FIG. 7 illustrates two timing diagrams corresponding to operations associated with the first configuration 704 and the second configuration 706 that demonstrate the operation of the Div8or9 component (e.g., the clock divider 108) under different conditions.

The upper timing diagram associated with the first configuration 704 shows the operation when div9_cont=0, representing the one-shot divide-by-9 mode. In this case, the clk32<0> signal shows the normal divide-by-8 clock periods 708, each lasting Ins or 32 UI (Unit Intervals). The clk32<1> signal is similar to clk32<0> but shifted by 31.25 ps (1 UI). The Div9 signal shows a pulse that triggers the insertion of a divide-by-9 cycle. When Div9 is asserted, a single extended clock period 710 of 1.125 ns or 36 UI is inserted, after which the clock returns to the normal divide-by-8 operation.

The lower timing diagram associated with the second configuration 706 illustrates the operation when div9_cont=1, representing the continuous divide-by-9 mode. Initially, the clk32<0> and clk32<1> signals operate in divide-by-8 mode, similar to the upper diagram. When the Div9 signal is asserted, both clk32<0> and clk32<1> switch to continuous divide-by-9 operation. In this mode, all clock periods are extended to 1.125 ns or 36 UI. The continuous divide-by-9 operation persists as long as the Div9 signal remains asserted.

These timing diagrams demonstrate how the Div8or9 component can introduce controlled clock period extensions, either as a one-time event or continuously.

FIG. 9 illustrates a routine 900 (e.g., method or process) in accordance with some examples. The operations discussed in connection with FIG. 9 can be performed sequentially, in parallel, and in any suitable order. The operations discussed in FIG. 9 can be performed by the PCIE receiver 102.

In operation 910, routine 900 accesses a training sequence comprising a plurality of unscrambled portions interleaved with a plurality of scrambled portions. In operation 912, routine 900 instructs an analog-to-digital converter (ADC) to sample the training sequence to generate a first set of digital symbols representing the plurality of unscrambled portions and the plurality of scrambled portions to an equalizer. In operation 914 routine 900 causes the ADC to periodically slip sampling of the training sequence to generate a second set of digital symbols in which the plurality of unscrambled portions of the training sequence are randomized. In operation 916, routine 900 trains one or more coefficients of the equalizer using the first set of digital symbols and the second set of digital symbols.

Figure 10:
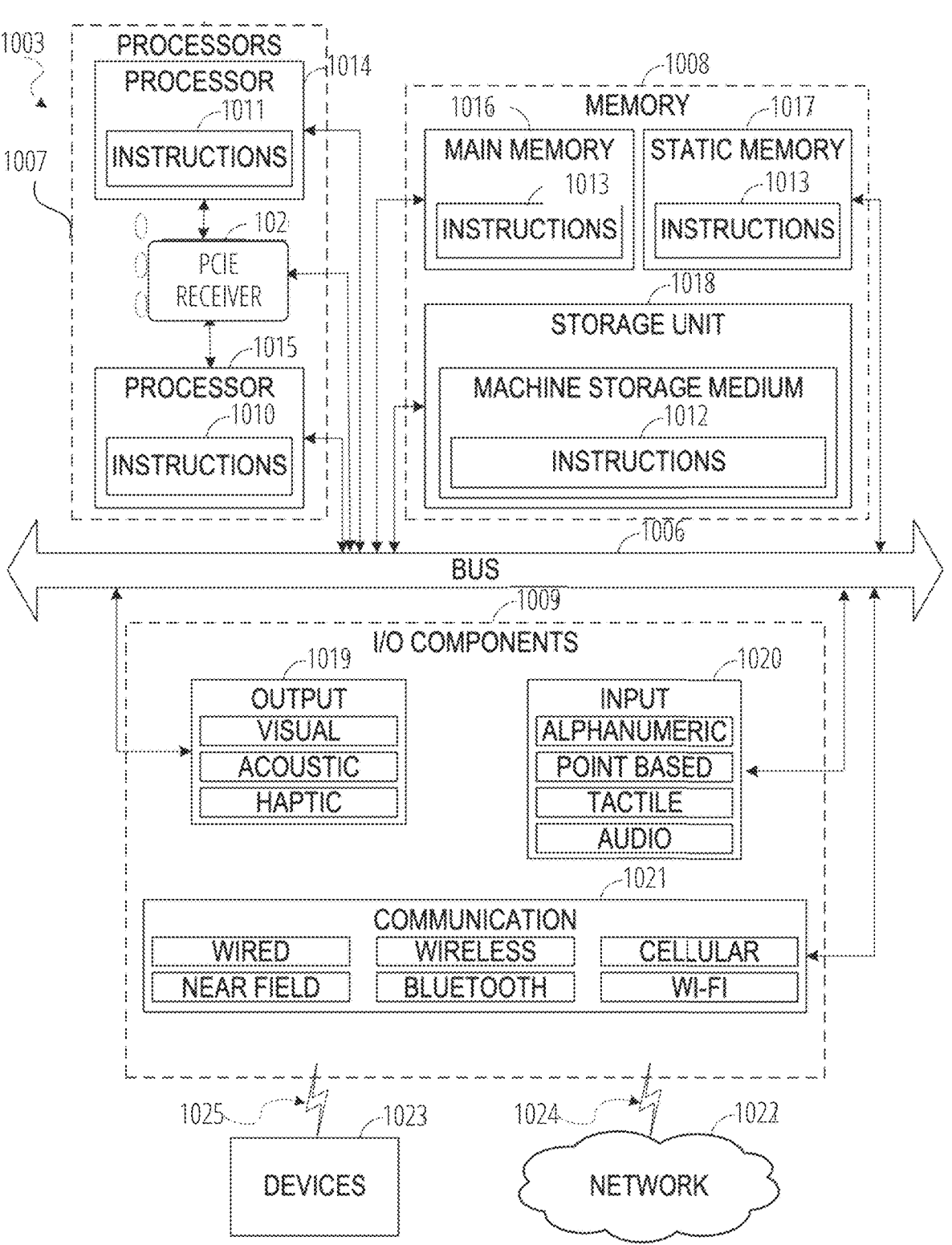
FIG. 10 is a functional block diagram of an example computing system for carrying out methods and operations described herein, in accordance with some examples.

FIG. 10 is a functional block diagram of a computing system 1003 for executing the above methods and other processes described above, along with other examples. A machine is shown in the form of the computing system 1003 within which a set of instructions may be executed for causing the machine to perform any one or more of the methods and other methodologies discussed herein, according to some examples. Specifically, FIG. 10 shows a diagrammatic representation of the machine in the example form of a computer system. The machine may include a bus 1006, processors 1007, memory 1008, and I/O components 1009, which may be configured to communicate with each other such as via the bus.

The machine may include instructions 1010, instructions 1011, instructions 1012, and instructions 1013 (e.g., software, a program, an application, an applet, an app, or other executable code) for causing the machine to perform any one or more of the methodologies discussed herein. For example, the instructions 1010, instructions 1011, instructions 1012, and instructions 1013 may cause the machine to execute a software system that executes the above processes described in the above description. The instructions 1010, instructions 1011, instructions 1012, and instructions 1013 transform the general, non-programmed machine into a particular machine programmed to carry out the described and illustrated functions in the manner described here. In alternative examples, the machine operates as a standalone device or may be coupled (e.g., networked) to other machines. In a networked deployment, the machine may operate in the capacity of a server machine or a client machine in a server-client network environment, or as a peer machine in a peer-to-peer (or distributed) network environment. The machine may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1010, instructions 1011, instructions 1012, and instructions 1013, sequentially or otherwise, that specify actions to be taken by the machine. Further, while only a single machine is illustrated, the term "machine" shall also be taken to include a collection of machines that individually or jointly execute the instructions 1010, instructions 1011, instructions 1012, and instructions 1013 to perform any one or more of the methodologies discussed herein.

In an example embodiment, the processors 1007 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1014 and a processor 1015 that may execute the instructions 1010, instructions 1011, instructions 1012, and instructions 1013. The term "processor" is intended to include multi-core processors 1007 that may comprise two or more independent processors (sometimes referred to as "cores") that may execute instructions contemporaneously. Although FIG. 10 shows multiple processors 1007, the computing system 1003 may include a single processor with a single core, a single processor with multiple cores (e.g., a multi-core processor), multiple processors with a single core, multiple processors with multiple cores, or any combination thereof. The processors 1007 can include the PCIE receiver 102 in some cases.

The memory 1008 may include a main memory 1016, a static memory 1017, and a storage unit 1018, both accessible to the processors 1007 such as via the bus 1006. The main memory 1016, the static memory 1017, and the storage unit 1018 store the instructions 1010, instructions 1011, instructions 1012, and instructions 1013 embodying any one or more of the processes, methodologies or functions described herein. The instructions 1010, instructions 1011, instructions 1012, and instructions 1013 may also reside, completely or partially, within the main memory 1016, within the static memory 1017, within the storage unit 1018, within at least one of the processors 1007 (e.g., within the processor's cache memory), or any suitable combination thereof, during execution thereof by the computing system 1003.

The I/O components 1009 may include a wide variety of components to receive input, provide output, produce output, transmit information, exchange information, capture measurements, and so on. The specific I/O components 1009 that are included in a particular machine will depend on the type of machine. For example, portable machines such as mobile phones will likely include a touch input device or other such input mechanisms, while a headless server machine will likely not include such a touch input device. It will be appreciated that the I/O components 1009 may include many other components that are not shown in FIG. 10. The I/O components 1009 are grouped according to functionality merely for simplifying the following discussion and the grouping is in no way limiting. In various example embodiments, the I/O components 1009 may include output components 1019 and input components 1020. The output components 1019 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 834 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1009 may include communication components 1021 operable to couple the computing system 1003 to a network 1022 or devices 1023 via a coupling 1024 and a coupling 1025, respectively. For example, the communication components 1021 may include a network interface component or another suitable device to interface with the network 1022. In further examples, the communication components 1021 may include wired communication components, wireless communication components, cellular communication components, and other communication components to provide communication via other modalities. The devices 1023 may be another machine or any of a wide variety of peripheral devices (e.g., a peripheral device coupled via a universal serial bus (USB)).

Executable Instructions and Machine Storage Medium

The various memories (e.g., 1008, 1018, and/or memory of the processors 1007, processor 1014, processor 1015) and/or the storage unit 1018 may store one or more sets of instructions and data structures (e.g., software) embodied or utilized by any one or more of the methodologies or functions described herein. These instructions, when executed by the processors 1007, cause various operations to implement the disclosed examples.

As used herein, the terms "machine-storage medium," "device-storage medium," and "non-transitory computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media, "computer-storage media," and "device-storage media" specifically exclude carrier waves, modulated data signals, and other such media, at least some of which are covered under the term "signal medium" discussed below.

Transmission Medium

In various example embodiments, one or more portions of the network 1022 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 838 or a portion of the network 838 may include a wireless or cellular network, and the coupling 842 may be a Code Division Multiple Access (CDMA) connection, a Global System for Mobile communications (GSM) connection, or another type of cellular or wireless coupling. In this example, the coupling 842 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1010, instructions 1011, instructions 1012, and instructions 1013 may be transmitted or received over the network 1022 using a transmission medium via a network interface device (e.g., a network interface component included in the communication components 1021) and utilizing any one of a number of well-known transfer protocols (e.g., hypertext transfer protocol (HTTP)). Similarly, the instructions 1010, instructions 1011, instructions 1012, and instructions 1013 may be transmitted or received using a transmission medium via the coupling 1025 (e.g., a peer-to-peer coupling) to the devices 1023. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1010, instructions 1011, instructions 1012, and instructions 1013 for execution by the computing system 1003, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

In view of the disclosure above, various examples are set forth below. It should be noted that one or more features of an example, taken in isolation or combination, should be considered within the disclosure of this application.

Example 1. A Peripheral Component Interconnect Express (PCIE) receiver comprising: an analog to digital converter (ADC); an equalizer; and one or more processors configured to perform operations comprising: accessing a training sequence comprising a plurality of unscrambled portions interleaved with a plurality of scrambled portions; instructing the ADC to sample the training sequence to generate a first set of digital symbols representing the plurality of unscrambled portions and the plurality of scrambled portions to the equalizer; causing the ADC to periodically slip sampling of the training sequence to generate a second set of digital symbols in which the plurality of unscrambled portions of the training sequence are randomized; and training one or more coefficients of the equalizer using the first set of digital symbols and the second set of digital symbols.

Example 2. The PCIE receiver of Example 1, wherein the training sequence is an analog training sequence processed by the ADC, and wherein the plurality of unscrambled portions is interleaved equally with the plurality of scrambled portions.

Example 3. The PCIE receiver of any one of Examples 1-2, comprising: clock circuitry configured to perform operations comprising: providing a first set of clock signals to the ADC to generate the first set of digital symbols; and periodically providing a second set of clock signals to the ADC to generate the second set of digital symbols, the second set of clock signals having a lower frequency than the first set of clock signals.

Example 4. The PCIE receiver of Example 3, wherein the second set of clock signals are provided during a single sampling cycle of the ADC.

Example 5. The PCIE receiver of any one of Examples 3-4, wherein the clock circuitry divides a reference clock by a first value to generate the first set of clock signals and divides the reference clock by a second value greater than the first value to generate the second set of clock signals.

Example 6. The PCIE receiver of Example 5, wherein the first value is eight and the second value is nine.

Example 7. The PCIE receiver of any one of Examples 3-6, wherein the operations performed by the one or more processors comprise: controlling the clock circuitry to provide the first set of clock signals to the ADC to generate a first portion of the first set of digital symbols during a first set of sampling cycles; detecting a condition for operating the ADC at a different clock frequency for a single sampling cycle; in response to detecting the condition, controlling the clock circuitry to provide the second set of clock signals to the ADC to generate the second set of digital symbols during the single sampling cycle.

Example 8. The PCIE receiver of Example 7, wherein the operations for controlling the clock circuitry to provide the second set of clock signals to the ADC comprise: detecting a transition in a pulse gate signal; and causing the clock circuitry to hold a value of one or more of the first set of clock signals for a specified time interval causing one or more pulses of the first set of clock signals to be swallowed.

Example 9. The PCIE receiver of Example 8, comprising: a NAND gate coupled to receive the one or more of the first set of clocks signals and the pulse gate signal.

Example 10. The PCIE receiver of any one of Examples 7-9, wherein the operations performed by the one or more processors comprise: determining that the single sampling cycle has been completed by the ADC; and in response to determining that the single sampling cycle has been completed by the ADC, controlling the clock circuitry to provide the first set of clock signals to the ADC to generate a second portion of the first set of digital symbols during one or more sampling cycles subsequent to the single sampling cycle.

Example 11. The PCIE receiver of any one of Examples 7-10, wherein the operations performed by the one or more processors comprise: accessing a configuration register associated with generating the condition; and generating the condition based on the configuration register.

Example 12. The PCIE receiver of Example 11, wherein the configuration register stores an individual value associated with generating the condition periodically, wherein the clock circuitry is controlled to provide the second set of clock signals at periodic intervals associated with the individual value.

Example 13. The PCIE receiver of Example 12, wherein the periodic intervals are randomly adjusted over time.

Example 14. The PCIE receiver of any one of Examples 11-13, wherein the configuration register stores an individual value associated with generating the condition one time, wherein the clock circuitry is controlled to provide the second set of clock signals at the one time.

Example 15. The PCIE receiver of any one of Examples 1-14, wherein each time the ADC slips sampling the training sequence, the plurality of unscrambled portions in digital symbols representing the training sequence are rotated by a specified number of unit intervals (UIs) across different taps of the equalizer.

Example 16. The PCIE receiver of Example 15, wherein the specified number of UIs comprises a quantity of UIs included in the plurality of unscrambled portions of the training sequence.

Example 17. The PCIE receiver of any one of Examples 8-16, wherein the plurality of unscrambled portions of the training sequence comprise four UIs and the plurality of unscrambled portions in the digital symbols comprise four UI.

Example 18. A method comprising: accessing a training sequence comprising a plurality of unscrambled portions interleaved with a plurality of scrambled portions; instructing an analog-to-digital converter (ADC) to sample the training sequence to generate a first set of digital symbols representing the plurality of unscrambled portions and the plurality of scrambled portions to an equalizer; causing the ADC to periodically slip sampling of the training sequence to generate a second set of digital symbols in which the plurality of unscrambled portions of the training sequence are randomized; and training one or more coefficients of the equalizer using the first set of digital symbols and the second set of digital symbols.

Example 19. The method of Example 18, wherein the training sequence is an analog training sequence processed by the ADC, and wherein the plurality of unscrambled portions are interleaved equally with the plurality of scrambled portions.

Example 20. A non-transitory computer-readable medium comprising computer-readable instructions that, when executed by one or more processors, cause the one or more processors to perform operations comprising: accessing a training sequence comprising a plurality of unscrambled portions interleaved with a plurality of scrambled portions; instructing an analog-to-digital converter (ADC) to sample the training sequence to generate a first set of digital symbols representing the plurality of unscrambled portions and the plurality of scrambled portions to an equalizer; causing the ADC to periodically slip sampling of the training sequence to generate a second set of digital symbols in which the plurality of unscrambled portions of the training sequence are randomized; and training one or more coefficients of the equalizer using the first set of digital symbols and the second set of digital symbols.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media (non-transitory computer readable media or medium) and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, method or process that includes elements in addition to those listed after such a term in a claim is still deemed to fall within the scope of that claim.

What is claimed is:

1. A Peripheral Component Interconnect Express (PCIE) receiver comprising:
    an analog to digital converter (ADC);
    an equalizer; and
    one or more processors configured to perform operations comprising:
        accessing a training sequence comprising a plurality of unscrambled portions interleaved with a plurality of scrambled portions;
        instructing the ADC to sample the training sequence to generate a first set of digital symbols representing the plurality of unscrambled portions and the plurality of scrambled portions to the equalizer;
        causing the ADC to periodically slip sampling of the training sequence to generate a second set of digital symbols in which the plurality of unscrambled portions of the training sequence are randomized; and
        training one or more coefficients of the equalizer using the first set of digital symbols and the second set of digital symbols.

2. The PCIE receiver of claim 1, wherein the training sequence is an analog training sequence processed by the ADC, and wherein the plurality of unscrambled portions is interleaved equally with the plurality of scrambled portions.

3. The PCIE receiver of claim 1, comprising:
    clock circuitry configured to perform operations comprising:
        providing a first set of clock signals to the ADC to generate the first set of digital symbols; and
        periodically providing a second set of clock signals to the ADC to generate the second set of digital symbols, the second set of clock signals having a lower frequency than the first set of clock signals.

4. The PCIE receiver of claim 3, wherein the second set of clock signals are provided during a single sampling cycle of the ADC.

5. The PCIE receiver of claim 3, wherein the clock circuitry divides a reference clock by a first value to generate the first set of clock signals and divides the reference clock by a second value greater than the first value to generate the second set of clock signals.

6. The PCIE receiver of claim 5, wherein the first value is eight and the second value is nine.

7. The PCIE receiver of claim 3, wherein the operations performed by the one or more processors comprise:

controlling the clock circuitry to provide the first set of clock signals to the ADC to generate a first portion of the first set of digital symbols during a first set of sampling cycles;

detecting a condition for operating the ADC at a different clock frequency for a single sampling cycle;

in response to detecting the condition, controlling the clock circuitry to provide the second set of clock signals to the ADC to generate the second set of digital symbols during the single sampling cycle.

8. The PCIE receiver of claim 7, wherein the operations for controlling the clock circuitry to provide the second set of clock signals to the ADC comprise:

detecting a transition in a pulse gate signal; and causing the clock circuitry to hold a value of one or more of the first set of clock signals for a specified time interval causing one or more pulses of the first set of clock signals to be swallowed.

9. The PCIE receiver of claim 8, comprising:

a NAND gate coupled to receive the one or more of the first set of clocks signals and the pulse gate signal.

10. The PCIE receiver of claim 8, wherein the plurality of unscrambled portions of the training sequence comprises a specified number of UIs and the plurality of unscrambled portions in the digital symbols comprises the specified number of UIs.

11. The PCIE receiver of claim 7, wherein the operations performed by the one or more processors comprise:

determining that the single sampling cycle has been completed by the ADC; and in response to determining that the single sampling cycle has been completed by the ADC, controlling the clock circuitry to provide the first set of clock signals to the ADC to generate a second portion of the first set of digital symbols during one or more sampling cycles subsequent to the single sampling cycle.

12. The PCIE receiver of claim 7, wherein the operations performed by the one or more processors comprise:

accessing a configuration register associated with generating the condition; and generating the condition based on the configuration register.

13. The PCIE receiver of claim 12, wherein the configuration register stores an individual value associated with generating the condition periodically, wherein the clock circuitry is controlled to provide the second set of clock signals at periodic intervals associated with the individual value.

14. The PCIE receiver of claim 13, wherein the periodic intervals are randomly adjusted over time.

15. The PCIE receiver of claim 12, wherein the configuration register stores an individual value associated with generating the condition one time, wherein the clock circuitry is controlled to provide the second set of clock signals at the one time.

16. The PCIE receiver of claim 1, wherein each time the ADC slips sampling the training sequence, the plurality of unscrambled portions in digital symbols representing the training sequence are rotated by a specified number of unit intervals (UIs) across different taps of the equalizer.

17. The PCIE receiver of claim 16, wherein the specified number of UIs comprises a quantity of UIs included in the plurality of unscrambled portions of the training sequence.

18. A method comprising:

accessing a training sequence comprising a plurality of unscrambled portions interleaved with a plurality of scrambled portions;

instructing an analog-to-digital converter (ADC) to sample the training sequence to generate a first set of digital symbols representing the plurality of unscrambled portions and the plurality of scrambled portions to an equalizer;

causing the ADC to periodically slip sampling of the training sequence to generate a second set of digital symbols in which the plurality of unscrambled portions of the training sequence are randomized; and training one or more coefficients of the equalizer using the first set of digital symbols and the second set of digital symbols.

19. The method of claim 18, wherein the training sequence is an analog training sequence processed by the ADC, and wherein the plurality of unscrambled portions are interleaved equally with the plurality of scrambled portions.

20. A non-transitory computer-readable medium comprising computer-readable instructions that, when executed by one or more processors, cause the one or more processors to perform operations comprising:

accessing a training sequence comprising a plurality of unscrambled portions interleaved with a plurality of scrambled portions;

instructing an analog-to-digital converter (ADC) to sample the training sequence to generate a first set of digital symbols representing the plurality of unscrambled portions and the plurality of scrambled portions to an equalizer;

causing the ADC to periodically slip sampling of the training sequence to generate a second set of digital symbols in which the plurality of unscrambled portions of the training sequence are randomized; and training one or more coefficients of the equalizer using the first set of digital symbols and the second set of digital symbols.

* * * * *